Inventors
Peter Fortescue
Francis R. Bell

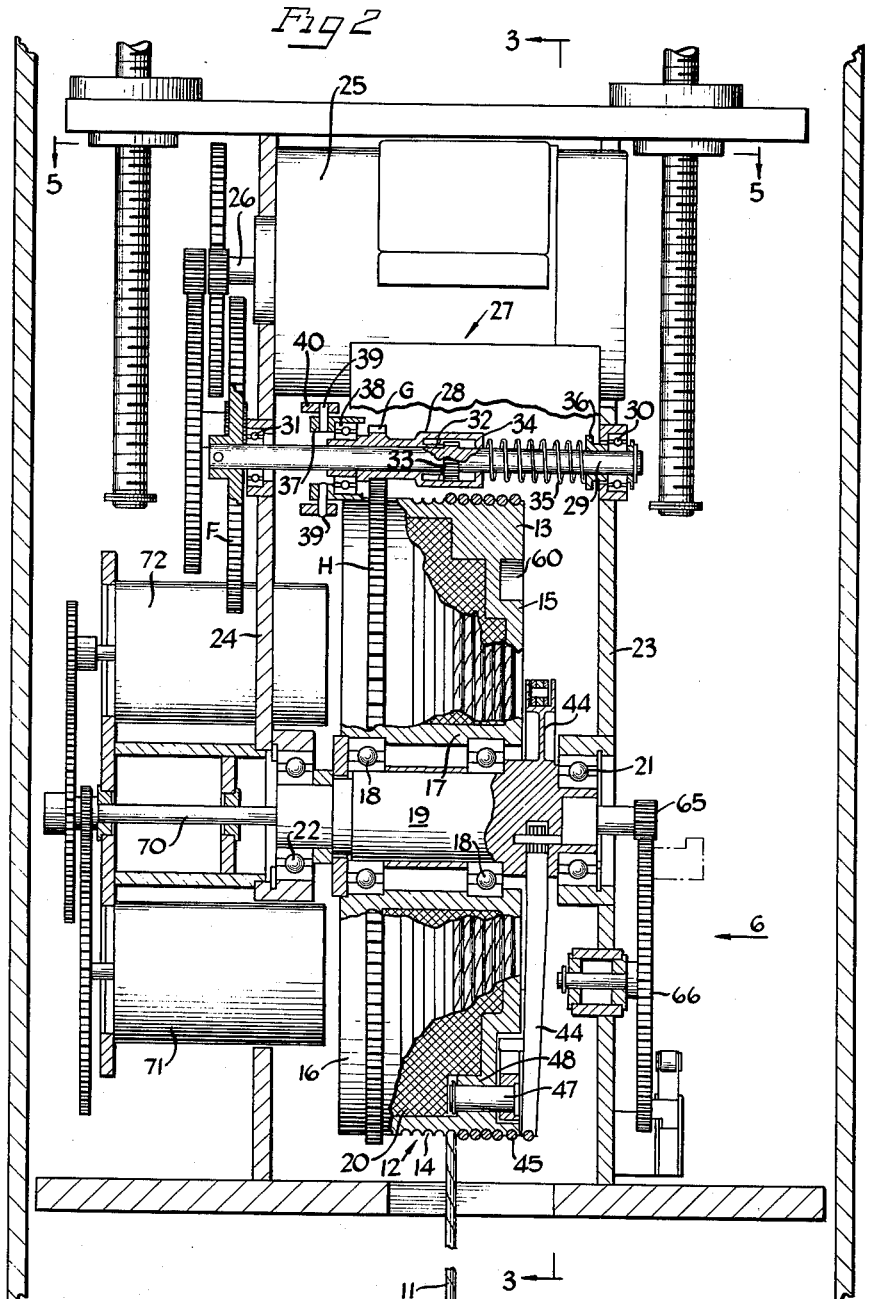

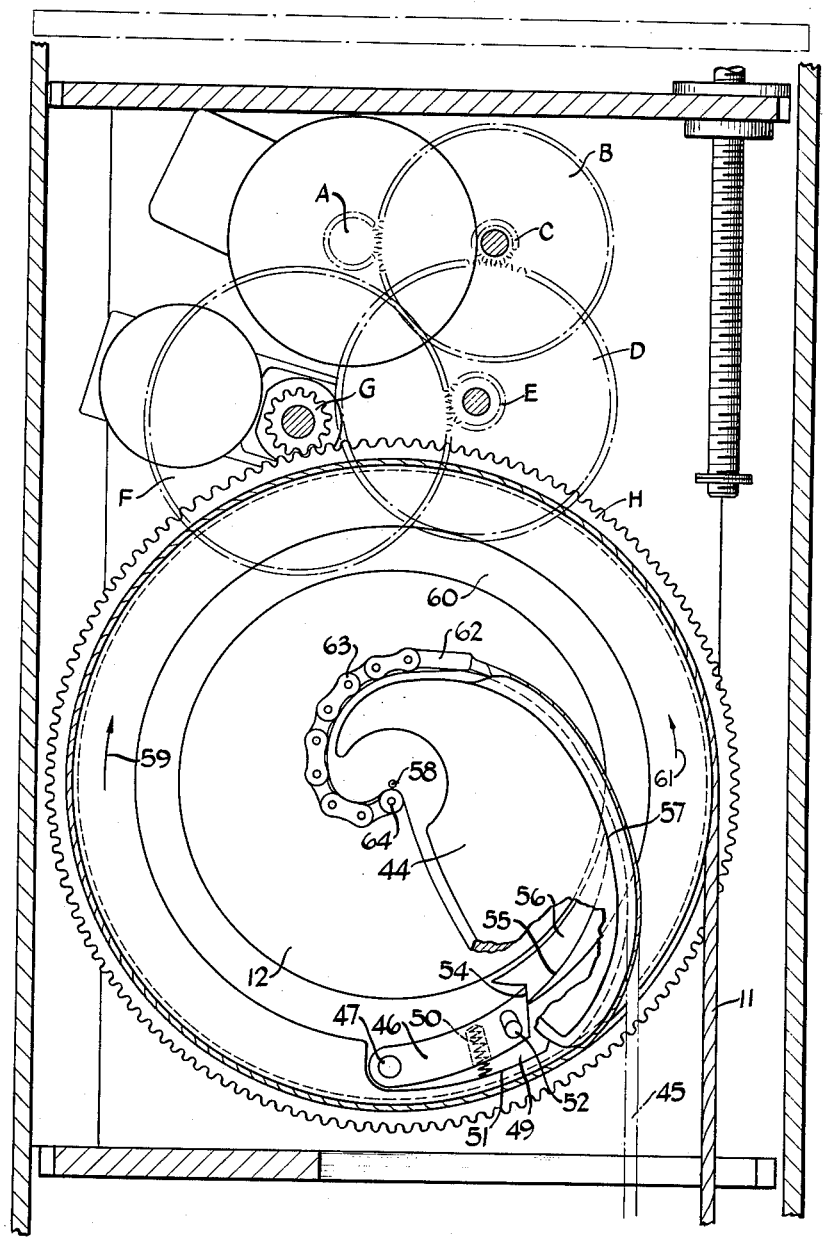

Inventors
Peter Fortescue
Francis R. Bell

3,202,580
REEL-TYPE CONTROL ROD DRIVE AND BRAKE AND BRAKING MECHANISM

Peter Fortescue, Rancho Santa Fe, and Francis R. Bell, La Jolla, San Diego, Calif., assignors to General Dynamics Corporation, New York, N.Y., a corporation of Delaware
Filed Feb. 11, 1963, Ser. No. 257,693
6 Claims. (Cl. 176—36)

The present invention relates to a control rod drive for use in nuclear reactors and more particularly, to a safety arrangement or system where in the case of loss of normal control or any other emergency which might cause a catastrophe or damage to the reactor, the control rod or rods by which the speed of the nuclear reaction is controlled may be quickly inserted into the core of the reactor for their full length or to a sufficient depth so as to stop the reaction until the malfunctioning of the reactor may be investigated and corrected.

In the type of reactor for which the invention herein is particularly suitable, the emergency or "scram" operation of shutting down the reactor is preferably effected by quickly releasing the adjustable axially vertical control rods which are normally suspended in the core of the reactor by means of cables attached to the upper ends of the control rods. This enables the control rods to be lowered or dropped into the core by the force of gravity without having to depend upon any other power source. In such cases, the upper end of the cable may be conveniently attached to, and wound around, a reel such as a drum, preferably mounted upon a horizontal axis, which drum may be rotated by a suitable motor in order to adjust the vertical position of the control rod from time to time, during normal operation, whenever occasion requires.

The normal adjustment of the control rod up or down is usually made in minute amounts, and the gear ratio between the motor and the drum may be in the neighborhood of 3,000 to 1. Hence, even at high motor speed the speed of insertion of the rod in the case of an emergency would not lower the control rod quickly enough to insure proper safety and thus prevent a catastrophe. Therefore, in the case of a scram operation it is usual to initiate the scram by disengaging the drum from the motor. This is done by switching off the current from an electromagnetic clutch which demands electric current in order to maintain an operative mechanical connection between the motor and the drum.

When the scram button is pressed down, the gearing which connects the drum to the motor is instantly unclutched. This enables the weight of the control rod to spin the reel freely as the rod descends by gravity into the reactor core.

However, it is found convenient, in some reactors, to have control rods from 8 to 16 feet in length and weighing from 100 to 500 pounds or more. In the case of a scram where the rod can fall about 12 feet, the uncontrolled descent of the control rod must be regulated during the scram in such a manner as not to unduly lengthen the time required to lower the control rod in the core for a sufficient depth to stop the reaction. On the other hand, the falling speed of the rod after it has reached a "safe" position in the core of the reactor, should be decelerated or slowed down to a safe level soon enough and in such a manner as to avoid unduly straining or breaking the cable by which the control rod is suspended from the drum. Since it is not practical or safe to equip the control rod itself with a mechanical brake or drag, it seems to be advisable to control the vertical movement of the rod at the cable or drum.

The problem is complicated by the requirement that the time length of the scram period, from the beginning to end, should not exceed a relatively short period, whether the control rod, at the beginning of the scram, happens to be in its highest or its lowest normal working position in the reactor core. Obviously, when it is recognized that the full force of gravity will cause an object to fall a distance of only 16 feet in one second, and when the rod, in one type of reactor may be required to drop a safe distance of 12 feet in about a second, there must be a minimum of un-necessary interference with the force of gravity during the initial portion of the drop. But on the other hand, whatever speed of drop has been developed, the falling speed of the rod should be slowed down to zero by the approximate time that the rod has reached its lowest position in the core. Also, an adequate deceleration of the falling rod shoud be accomplished after the rod has reached a safe position and before it has fallen to its ultimate desired bottom position.

Thus in a type of reactor which requires that the rod be promptly dropped a distance of 12 feet in the case of a scram, we may have a situation where the falling speed of the rod should preferably be accelerated to a maximum through the first $9/10$ of the falling distance or $9/10$ of the total falling period, while the deceleration from maximum speed down to zero should occur in a distance of about one foot or about a tenth of a second. In addition, during the scram operation, the pull on the cable should not be reduced to less than about 25% of terrestrial gravity, otherwise there is danger that the cable may jump its track on the winding drum.

For a suspension type of control rod within the range of weight and length mentioned herein, it seems desirable to permit an average accelerating force of between 60% and 80% of gravity during the first ninety percent of the total scram fall, but the accelerating force during the final ten percent of the fall should not exceed about ten times the accelerating force. Also there are requirements imposed by space limitations, and finally, the apparatus employed must be safe and operative under all conceivable conditions now known or which may be encountered during the future use of the equipment.

The principal object of the present invention is to provide a safe, fool-proof, durable, economical, efficient and simple apparatus or system of the class herein generally described which will satisfactorily meet the requirements above referred to, and which will not materially interfere with the efficient and economical operation of the nuclear reactor as a whole.

A further object of the invention is to provide a system or apparatus for effecting a scram or emergency shut down of the reactor without resorting to a power source other than gravity.

In the following description there is disclosed an embodiment of the invention in which the potential energy stored in the control rod at its normal elevated position in the reactor core, is used to impart motion to a rotating member, such as a flywheel, in such manner that while there may be a reasonably small reduction in the speed of descent of the rod during the initial part of the total scram period until a "safe" position has been reached, the proportion of the kinetic energy developed in the rotating part, as compared with that retained by the rod itself, increases substantially and rapidly during the latter portion of the fall, whereby the kinetic energy of the rod itself will be reduced as the rod approaches its final bottom position in the reactor, so that the decelerating force applied to the rod progressively reduces its speed to a safe value by the time the control rod reaches its lowest point at the end of the scram.

In the present embodiment, the cable by which the rod is suspended in the reactor, is wound around a drum or reel mounted to rotate on a horizontal axis, the exterior of the reel or drum being of comparatively large diameter and provided with circumferential grooves which accommodate the coils or turns of the suspension cable during the normal operation of the reactor, said portion of the drum functioning as a flywheel. The cable is automatically disconnected from the drum or reel when the upper end of the cable is completely unwound, but the cable remains firmly attached to a rotary member which is normally connected to the drum.

In the drawings accompanying the following description of said embodiment,

FIGURE 2 is an elevation of the apparatus, partly in section;

FIGURE 3 is a section taken on line 3—3 of FIGURE 2;

FIGURE 6 is a fragmentary diagrammatic side elevation of the indicator drive, looking in the direction of the arrow 6 in FIGURE 2.

Figure 1:
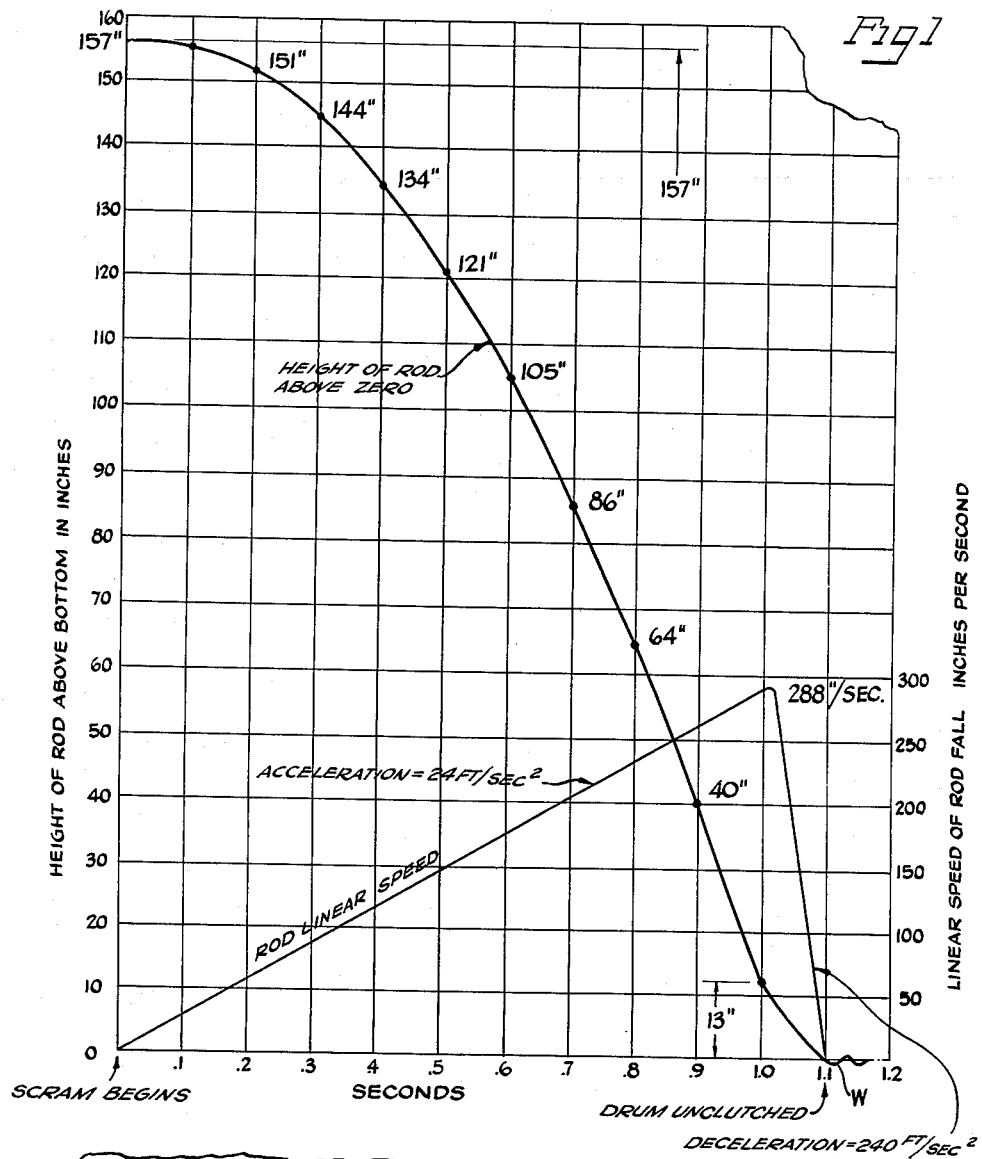
FIGURE 1 is a diagram showing the manner in which the falling speed of the control rod during the "scram" period is accelerated and then decelerated.
Figure 8:
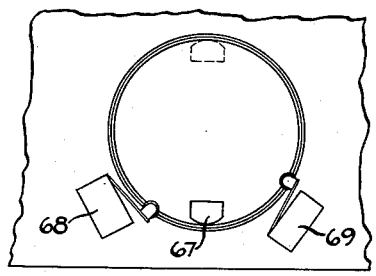

Referring to FIGURE 2, the control rod 10, in this case weighing about 120 pounds, is shown diagrammatically as connected to the supporting cable 11, which shows the cable in the position which it occupies on the winding drum 12, when the reactor is in normal operation with the control located substantially at its uppermost normal working position in the reactor core.

The cable drum 12 includes a cylindrical outer rim portion 13, about 10 inches in outside diameter and provided with a series of about 8 helical grooves 14 therein, for accommodating successive coils or turns of the supporting cable 11. The 4 normally empty grooves 14 on the drum are used for accommodating the cable when it is desired to raise the control rod completely out of the reactor core, for servicing or for any other reason.

Structurally, the drum 12 is made with closed end plates 15 and 16 united to the ends of a tubular hub portion 17 which is provided with bearings, such as 18, enabling the drum 12 to spin freely upon a central shaft or axle 19 when the drum 12 is unclutched from shaft 19. So as to augment the flywheel effect, the space between the rim 13 of the drum and the hub 17 is preferably filled with lead 20. The shaft 19 is mounted to rotate upon a pair of spaced bearings 21 and 22 carried respectively by the vertical stationary side plates 23 and 24 (see also FIGURE 4). The composite rotating unit which includes the drum 12 and shaft 19 in this case, has a weight of about 80 pounds.

*The reel drive*

Figure 5:
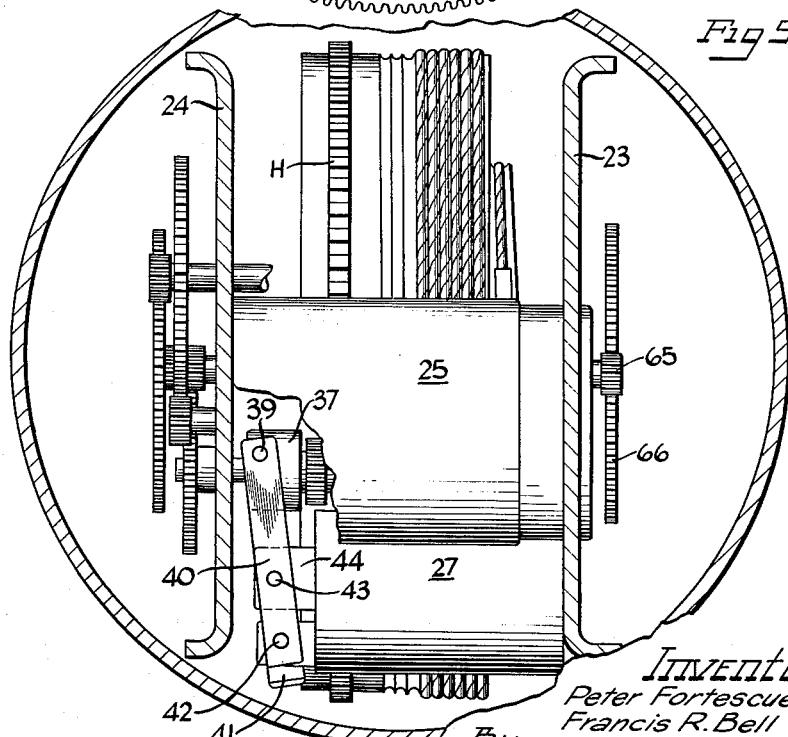
FIGURE 5 is a sectional plan view of the apparatus taken on line 5—5 of FIGURE 2.

The adjustment of the control rod depth in the reactor is effected by a power source, such as an electric motor and gear box combination 25 (see FIGURE 2), connected to the drum 12 by means of the following gear train. The motor has a power take-off shaft 26 the end of which shaft is equipped with a pinion A (see FIGURE 3) which drives a gear train comprising a spur gear B, pinion C, spur gear D, pinion E, spur gear F, and pinion G. Pinion G is normally directly engaged with the teeth on a large spur gear H made as an integral part of the rim 13 of the drum 12, and is normally held in clutching engagement with the same by means of a solenoid clutch designated as a whole by 27 (see FIGURES 2 and 5).

Said pinion G is made integral with a tubular sleeve member 28 which slides upon a horizontal shaft 29 the opposite ends of which are mounted to rotate in bearings 30 and 31 carried by the spaced side plates 23 and 24. The left hand end of the shaft 29 is fixed in the hub of the gear F so that the shaft 29 and gear F will always rotate together as a unit. The slide member 28, at its right hand end, is bored out so as to accommodate splines 32 which always engage with teeth 33 on the outside of said shaft 29, while permitting sliding movement of the sleeve 28 on said shaft. To the right of the teeth 33 on shaft 29 there is a sliding collar 34 against which presses a coiled compression spring 35, the right hand end of which engages a small flanged collar 36 fixed on the right hand end of shaft 29. At all times, the spring 35 tends to push the sleeve 28 to the left and move the teeth of pinion G out of engagement with the teeth on gear H on the drum 12. However, in normal operation, the push of said spring 35 is overcome by a solenoid clutch.

Said clutch (see FIGURE 5) includes a normally stationary collar 37 which is fitted with a pair of diametrically spaced pins 39 in a bifurcated lever 40. The bifurcated lever 40, as shown best in FIGURE 5, has its other end 41 mounted on a pivot pin 42 carried by a fixed part of the solenoid frame and the intermediate part of said lever 40 is provided with a pin 43 which connects the lever 40 to the movable plunger 44 of the solenoid 27. The solenoid 27 is normally constantly energized and hence holds the teeth of the respective gears G and H in driving engagement. However, when the electric current in the solenoid 27 is interrupted by the "scram" button or otherwise, the compression spring 35 pushes the slide member 28 on shaft 29 to the left so that the gears G and H are disengaged, thereby permitting the drum 12 and the parts associated with it to spin freely on or with the shaft 29 due to the weight of the control rod 10 which pulls down on the cable 11 wrapped around the drum.

*The wind off cam and the over-running clutch*

Referring now to FIGURES 2 and 3, it will be observed that on the right end of shaft 19 (see FIGURE 2) there is formed a spiral track member or cam 44 which forms a spiral support for the terminal portion of cable 11. This cam member 44 is normally clutched to the drum and rotates with the drum.

During the scram operation, the cable end 45 runs off the last groove of the drum rim 13 and transfers to a groove formed on the outer portion of the cam 44. It should be noted that during the scram operation and until the control rod finally reaches its bottom position in the core of the reactor, the outer end of the cam 44 and the adjacent face of the rim 13 of drum 12 are held in driving engagement by means of an over-running clutch (shown best in FIGURE 3).

Said clutch includes a driving pawl 46, one end of which is pivoted on a pin 47 fixed in an internal boss 48 on the inside of the drum rim 13. Said pawl 46 is located in a recess 49 in the outer face of the rim 13 of the drum and is normally forced inwardly by coiled compression spring 50 located in a pocket in the pawl 46, the outer end of the spring extending out of the pocket and bearing against the outer wall 51 of the recess 49. The inward rocking movement of the pawl 46 is limited by a pin 52 fixed in the floor of the recess 49 and extending through a short slot 53 in the end of pawl 46.

Figure 4:
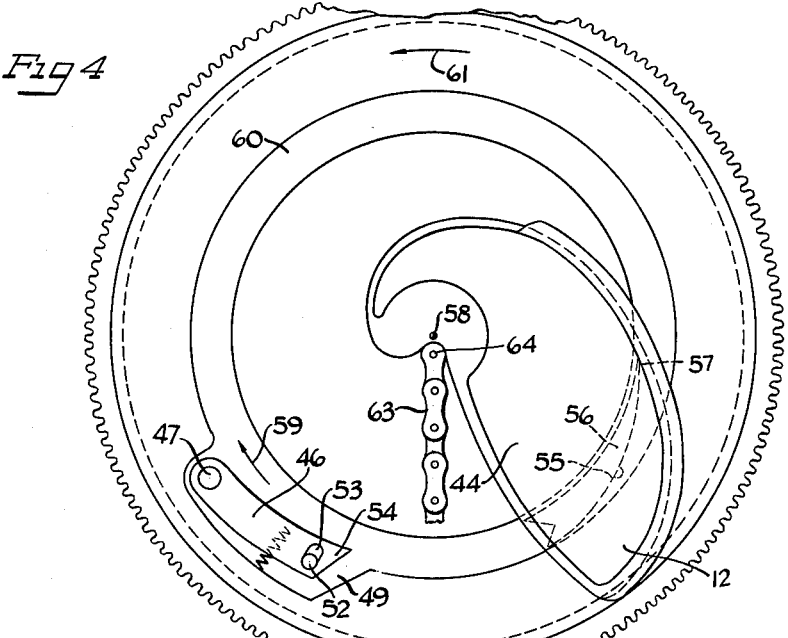
FIGURE 4 is a view similar to FIGURE 3, but showing only the drum part of the apparatus in the position which it occupies when the scram operation has been almost completed.

The point 54 of the pawl 46 in its normal position, shown in FIGURE 3, is normally forced inwardly by the spring 50 so that said point 54 is located inwardly of the edge 55 of a "land" 56 formed on the inside face of the cam 44. The outer edge or face 55 of said "land" 56 is formed with a tail 57, the inner end of which is in a position closer to the center of rotation of the axis 58 of the cam shaft 19. Means are provided to permit the drum 12 to rotate freely in the direction of the arrow 59 after the scram operation is completed. At this time, the pawl 46 is in the unlatched position as shown in FIGURE 4, the cam 44 is stationary, and the "land" 56 is accommodated in a circular channel 60 formed in the outer face of the rim 13 of the rotating drum 12 (see also FIGURE 2). During the free running movement of the drum 12 after the cam 44 has reached a position of rest, the pawl 46, at each of its revolutions, when it encounters the stationary land on the inside face of cam 44, will slide along the sloping outer edge or ramp 55 of the land 56 and compress the spring 50. Finally, upon reaching its limit of outward pivotal movement, the pawl 46 will drop off the edge 55 of the land 56. Thereafter the pawl 46 will serve as a ratchet which permits the drum 12 to coast around the cam shaft 19 until the friction incidental to the rotation of the drum on its bearings will finally absorb the kinetic energy of the wheel and bring it to a standstill. When the normal operation of the system can be resumed, the drum clutch solenoid 27 can be re-energized so as to re-engage the pinion gear G with the drum gear H, whereupon the motor 25 is switched on so as to rotate the drum 12 in the direction of the arrow 61, which is the hoisting direction. The rotation of the drum 12 in the hoisting direction will cause the pawl 46 to move into latching engagement with the land 56 of the cam 44, as shown in FIGURE 3 of the drawings. In this latched position, there is no difficulty in leading the cable 11 across the clearance gap between the adjacent edges of the drum 12 and the cam 44, because when the overrun clutch pawl 46 is in the position shown in FIGURE 3, as soon as the hoisting is commenced in the direction of arrow 61, the drum and cam shaft will thereafter remain in proper registration, until another scram operation is required.

*Deceleration*

In a reel and cable arrangement of the class described, the upper end of the cable is attached to a point located upon a rotary member which participates in the hoisting operation. The hoisting member, in the present instance, comprises a cylindrical drum mounted to rotate about the axis of a shaft to which the cable is attached. If the point of attachment were to be fixed on the circumference of the drum, the deceleration of the falling speed of the rod during the scram operation would have to be effected during the last quarter turn of the rotation of the reel or drum at the end of the scram operation. At the beginning of the scram operation, the uncontrolled fall of the rod would cause it to develop a falling speed of 32 feet per second during the first second, except as that freedom of said fall might be modified by other factors, such as friction, or the inertia of the drum and associated parts.

Referring now to the diagram in FIGURE 1, it has been assumed that in the apparatus described herein, these other factors would reduce the acceleration from the normal G value of 32 feet per second per second, to approximately 24 feet per second per second, so as to impart to the rod a falling speed of 24 feet per second or 288 inches per second, at the end of the first complete second of fall. By this time, the rod would have descended from a height of 157 inches to a height of 13 inches, i.e., just 12 feet, and it would be necessary in some way to dispose of the kinetic energy acquired by the rod before it reaches a rest position at the end of the scram.

If all of this energy of the falling rod were to be expended or neutralized in one ¼ turn of the reel, most of it would have to be expended in the last 2 or 3 inches of the lower sector of a quarter-turn so that the decelerating pull of the cable to arrest the downward movement of the rod would have to be enormous, possibly from 50 to 100 G. For a rod weighing 120 pounds, the pull would be in the neighborhood of 6,000 to 12,000 pounds, and requiring a cable of a size and character which would be quite impractical. This difficulty might be reduced to some extent by making the drum very large so as to increase the diameter of the coils of the cable wound on the drum. However, any considerable increase in the diameter of the drum would probably be impossible due to space limitations, and might be accompanied by such an increase in the total inertia of the system that the scram period might be lengthened to such an extent as to endanger the safety of the installation.

Referring now to the present embodiment of the invention herein described, the drum is 10 inches in diameter and, as shown in FIGURE 1, the total 157 inches of fall of the rod includes 144 inches of fall during the first second, during which period there is no change in the acceleration or in the ratio between the amount of kinetic energy absorbed by the rod and by the rotating system. The last 13 inches of fall will be effected in a tenth of a second, during which time, the rod will give up its acquired velocity of 288 inches per second and hence, the deceleration during that short final period of a tenth of a second must be at an average rate of 240 feet per second, per second, i.e., ten times its rate of acceleration during the first second of fall. This is within practical limits and is effected by the arrangement herein described.

Referring now to FIGURE 3, it will be seen that at the end of the upper portion of the cable 11 there is a socket or clevis 62 to which there is attached a short chain 63, which enables the upper end of the cable to flex freely around the hub part of the cam 44. The end of chain 63 is anchored on a pin 64 carried by the shaft 19 about ¼ of an inch from the axis 58 around which the system rotates. The total length of the chain and cable extending from the pin 64 to around the spiral drum or groove of the cam 44 is approximately 13 inches, the curvature and length of the cam being such that the effective radius of the cam 44 between its outer point and the axis 58, requires the cam to move through approximately one revolution around the axis 58 before the cable has been all unwound off the cam, and has finally reached substantially the position shown in FIGURE 4, in which position the cam 44 on shaft 19 serves as the support for the upper end of the cable. Hence, during the last 13 inches of fall, and during one tenth of the final second of the scram, the speed and fall of the rod is being reduced at an approximately constant rate of deceleration, while most of the kinetic energy lost by the falling rod is being absorbed in accelerating the rotary speed of the drum or flywheel.

The cam curve is so designed that the deceleration of the rod fall during the final revolution of the cam around its axis is made substantially uniform so as to avoid placing any undue peak strain on the cable at any point in the deceleration cycle.

It will be understood that at the approximate bottom point of the fall and when the pin 64 is vertically below the axis 58, the cable no longer exerts any force tending to rotate the shaft 19 so that there is nothing to prevent the drum from coasting, but the shaft 19 will no longer coast with the drum because the pawl 56 is disengaged. By this time, substantially all of the kinetic energy developed in the system will have been absorbed by the drum, except for parasitic losses, such as bearing friction, and also the small amount of energy necessary to decelerate the shaft and cam to zero speed, although there may be a slight yoyo tendency, as indicated by the small wiggle W at the bottom end of the speed curve in FIGURE 1. Such yoyo effect as may occur is quickly arrested by bearing friction, and also by the bulge on the rear face of the cam, which engages the chain 63.

The amount of kinetic energy absorbed by the cam 44 with its shaft 19 is a very small fraction of that which has been transferred to the drum 12, because the weight of the cam and shaft is only a small fraction of the weight of the drum and also its effective inertia radius is much less than that of the drum.

The foregoing example describes the operation of the system when the total distance of the scram fall is a maximum of 157 inches between the highest working position of the control rod and its lowest point at the end of the scram. Where the rod, in case of a scram, is dropped from an intermediate height, the operation is even more efficient, because a shorter interval of time is required for the rod to reach the 13 inch level, and consequently there is less kinetic energy to be absorbed by the drum.

*Instrumentation*

The general arrangement of the apparatus is such as not to interfere with the usual system or apparatus generally employed for operating nuclear power reactors. For example, the main shaft 19 on which the cam 44 is mounted and of which it forms a part, has at its right hand end an extension on which is mounted a pinion 65 meshing with a timing or program gear 66 which, as shown in FIGURE 6, is equipped with a cam element 67 operating suitable relays or switches 68 and 69 which indicate the position of the rod at various times during the operation. Similarly, at the opposite end of said shaft 19, there is another shaft 70 which is used to operate a conventional fine synchro device 71 and a rough synchro device 72 by which the control rod may be adjusted or controlled.

If, because of space limitations or any other reason a smaller, or un-weighted flywheel is needed, the flywheel may be geared to run at a higher r.p.m. speed than the cam shaft 19. For example, a wheel of relatively small size and weight can be arranged to rotate on axis spaced outwardly from the periphery of the drum 12 and equipped with a small pinion meshing with the gear H on drum 12.

The embodiment herein described, although usable with various types of reactors, is shown as applied to a reactor in which the control rod should preferably be dropped at a substantially uniformly accelerated speed for a major portion of its fall, and where the deceleration takes place during a minor part of its fall just before it reaches its lowest position in the core. This is the most exacting condition encountered. However, where the reactor is of the type in which a "safe" condition is attained after the control rod has been dropped only about 6 inches or 12 inches below its previous normal operating level, the deceleration can commence quite early in the scram cycle, in which case deceleration may be milder than in the embodiment specifically described herein. For example, to lengthen the period of deceleration the length of the decreasing radius terminal portion of the cable groove can be increased so as to accommodate a longer portion of the cable.

A patent is solicited for any and all herein disclosed patentable subject matter invented by applicants.

The embodiment disclosed herein may be changed or modified without departing from the scope of the invention.

Various features now believed to be new and patentable are set forth in the appended claims.

What is claimed is:

1. For use in a nuclear reactor having a vertically movable control rod, a cable for suspending said rod, a motor, means including a clutch for connecting the motor to said cable for adjusting the operating height of the rod, and means for promptly disengaging the clutch in case of an emergency which requires a quick fall of the control rod, the method of controlling said emergency fall of the control rod to prevent the rod from arriving at a desired final position at excessive speed while not unduly slowing down the fall of the rod to a safe position, which method comprises,
    (a) first disengaging said clutch so as to permit the rod to fall quickly to a safe position
    (b) while using a percentage of the energy developed in said emergency fall to effect uni-directional rotary movement of a flywheel geared to and driven by said cable,
    (c) and then, after the rod reaches a safe position, progressively increasing said percentage automatically during the later period of the emergency fall of the rod, thereby progressively decelerating the fall of the rod during said final period to a safe speed before the rod reaches its bottom position, and
    (d) then disconnecting said cable from said flywheel and permitting said flywheel to continue its said uni-directional movement.

2. The subject matter of claim 1, in which the increase in said percentage is obtained by automatically progressively increasing the ratio between the peripheral speed of said flywheel and the linear speed of the rod.

3. For use in a nuclear reactor having a vertically movable control rod, a cable for suspending said rod, a motor, and means connecting the motor to said cable for adjusting the height of the rod,
    means for controlling the fall of the control rod in an emergency which requires a quick fall of the rod so as to prevent the rod from arriving at a desired lower position at excessive speed while not unduly prolonging the emergency fall of the rod, which means comprises,
    (a) a rotatable support for said cable including a reel for suspending said rod during normal operation of the reactor,
    (b) a rotatable flywheel,
    (c) means for drivingly connecting the support to said flywheel so as to rotate the flywheel unidirectionally throughout the descent of the rod, including a free-wheeling clutch permitting said wheel to continue its said rotation free from the cable after said rod reaches its bottom position in the reactor,
    (d) a clutch for disengaging said motor from said cable at the start of the emergency fall,
    (e) and including means, operating subsequent to the arrival of the rod at a safe position, for progressively transferring from the rod to the wheel a sufficient amount of the kinetic energy acquired by the rod in its fall to progressively decelerate the fall of the rod to a safe speed before the rod reaches its bottom position.

4. For use in a nuclear reactor having a vertically movable control rod, a cable for suspending said rod, a motor, means connecting the motor to said cable for adjusting the height of the rod, including a clutch, and means for promptly disengaging the clutch in case of an emergency which requires a quick fall of the control rod,
    means for controlling said fall of the control rod to prevent the rod from arriving at a desired lower position at excessive speed while not unduly slowing down the fall of the rod, which means comprises,
    (a) a rotatable support for said cable including a reel for suspending said rod during normal operation of the reactor,
    (b) a rotatable flywheel,
    (c) a free wheeling clutch for drivingly connecting the support to said flywheel during the descent of the rod, but permitting continued rotation of said wheel, free from the support, after said rod reaches its bottom position in the reactor,
    (d) the arrangement including means for automatically reducing the ratio between the linear speed of the rod and the peripheral speed of the flywheel during said fall so that a greater percentage of the kinetic energy developed by the descent of the rod will be absorbed by the flywheel during the lower portion of the descent of the rod than was absorbed by the flywheel during the upper portion of the descent of the rod.

5. The subject matter of claim 3, in which the support is provided with a cam having a circumferentially extending spiral track for supporting the upper terminal portion of the cable and at the inner end of which spiral track the upper extremity of the cable is secured.

6. The subject matter of claim 5, in which the flywheel is rotatable on the same axis as the reel and has a means for winding up a part of the cable intermediate the rod and the cam.

References Cited by the Examiner

UNITED STATES PATENTS 3,018,240  1/62  Bevilacqua _____ 176—35

FOREIGN PATENTS 817,999  8/59  Great Britain.
822,752  10/59  Great Britain.
859,811  1/61  Great Britain.

CARL D. QUARFORTH, *Primary Examiner.*

REUBEN EPSTEIN, *Examiner.*

UNITED STATES PATENT OFFICE
CERTIFICATE OF CORRECTION

Patent No. 3,202,580                                        August 24, 1965

Peter Fortescue et al.

It is hereby certified that error appears in the above numbered patent requiring correction and that the said Letters Patent should read as corrected below.

Column 2, line 42, for "accelerating" read -- decelerating --.

Signed and sealed this 21st day of June 1966.

(SEAL)
Attest:

ERNEST W. SWIDER                                    EDWARD J. BRENNER
Attesting Officer                                        Commissioner of Patents